United States Patent
Wang et al.

(10) Patent No.: US 7,492,809 B2
(45) Date of Patent: Feb. 17, 2009

(54) BLIND SPEECH USER INTERFERENCE CANCELLATION (SUIC) FOR HIGH SPEED DOWNLINK PACKET ACCESS (HSDPA)

(75) Inventors: Haifeng Wang, Oulu (FI); Jorma Lilleberg, Oulu (FI)

(73) Assignee: Nokia Corporation, Espoo (FI)

( * ) Notice: Subject to any disclaimer, the term of this patent is extended or adjusted under 35 U.S.C. 154(b) by 1126 days.

(21) Appl. No.: 10/644,051

(22) Filed: Aug. 19, 2003

(65) Prior Publication Data

US 2005/0043943 A1   Feb. 24, 2005

(51) Int. Cl.
H04B 1/00 (2006.01)
(52) U.S. Cl. .................. 375/150; 375/144; 375/147; 375/148; 370/335
(58) Field of Classification Search ............... 375/148, 375/147, 150, 144; 370/335
See application file for complete search history.

(56) References Cited

U.S. PATENT DOCUMENTS

| | | | | |
|---|---|---|---|---|
| 5,325,394 | A * | 6/1994 | Bruckert | 375/148 |
| 6,285,669 | B1 * | 9/2001 | Gutierrez | 370/335 |
| 6,724,809 | B2 * | 4/2004 | Reznik | 375/148 |
| 6,816,541 | B1 * | 11/2004 | Schmidl | 375/148 |
| 2003/0021333 | A1 * | 1/2003 | Blessent | 375/147 |
| 2003/0235240 | A1 * | 12/2003 | Kawamoto et al. | 375/148 |

OTHER PUBLICATIONS

3GPP TR25.858 V5.0.0 (Mar. 2002), "High speed downlink packet access: Physical layer aspects (Rel5)".
3GPP TR25.101, "UE Radio Transmission and Reception (FDD)".
S. Verdu, Multiuser Detection: Cambridge University Press, chapters 6.2, 6.4 and 7.3, 1998.
M. Honig, U. Madhow, and S. Verdu, "Blind adaptive multiuser detection," IEEE Trans. Inform. Theory, vol. 41, pp. 944-960, Jul. 1995.
X. Wang and V. Poor, "Blind multiuser detection: A subspace approach," IEEE Trans. Inform. Theory, vol. 44, pp. 677-690, Mar. 1998.
D. Samardzija, N. Mandayam, and I. Seskar, "Nonlinear adaptive blind interference cancellation for DS-CDMA systems," in The IEE Vehicular Technology Conf,e (VTC), Boston, MA, Sep. 2000.
S. Ulukus and R. Yates, "A blind adaptive decorrelating detector for CDMA systems," IEEE J. Select. Areas Commun., vol. 16, pp. 1530-1541, Oct. 1998.
U. Madhow, "Blind adaptive interference suppression for direct-sequence CDMA," in Proc. IEEE, Special Issue on Blind Identification and Equalization, Oct. 1998, pp. 2049-2069.

(Continued)

*Primary Examiner*—Sudhanshu C Pathak
(74) *Attorney, Agent, or Firm*—Ware Fressola, Van Der Sluys & Adolphson, LLP.

(57) ABSTRACT

This invention describes a blind speech user interference cancellation receiver for a high-speed downlink packet access (HSDPA). The key component of the blind SUIC receiver is a joint estimation on hard-decision HSDPA signals and soft-decision interfering speech user (ISU) signals with a full Walsh transform correlator used instead of the conventional RAKER, where the outputs are separated into two parts: the desired HSDPA signal with known spreading codes and the ISU signal with unknown spreading codes. The invention further describes a multistage processing for reaching a targeted convergence rate or a desired bit-error-rate for a received signal involving a hard-decision on the desired HSDPA signal and a soft-decision on the ISU signal.

11 Claims, 5 Drawing Sheets

OTHER PUBLICATIONS

M.K. Varanasi and B. Aazhang, "Multistage detection for asynchronous code-division multiple-access communications," IEEE Transactions on Communications, COM-38(4), Apr. 1990.

3GPP TR25.991: Feasibility study on the mitigation of the effect of the common pilot channel (CPICH) interference at the user equipment, 2002.

3GPP R4-01-1232, Motorola, "CPICH Cancellation Complexity."

M. Heikkila, P. Komulainen, and J. Lilleberg, "Interference Suppression in CDMA Downlink through Adaptive Channel Equalization," VTC99, Sep. 1999.

M.K. Varanasi and B. Aazhang, "Near-Optimum Detection in Synchronous Code-Division Multiple-Access Systems," IEE Transactions on Communications, vol. 39, pp. 725-736, May 1991.

* cited by examiner

BLIND SPEECH USER INTERFERENCE CANCELLATION (SUIC) FOR HIGH SPEED DOWNLINK PACKET ACCESS (HSDPA)

FIELD OF THE INVENTION

This invention generally relates to a blind speech user interference cancellation for high speed downlink packet access (HSDPA) and more specifically to detecting a desired HSDPA signal by a hard-decision and an interfering speech user signal by a soft-decision using multistage processing.

BACKGROUND OF THE INVENTION

1. Field and Background of the Invention

High speed downlink packet access (HSDPA) described in 3GPP TR25.858 V5.0.0 (2002-3), "High speed downlink packet access: Physical layer aspects (Rel5)", also known as Rel5, is underway supporting the evolution of third-generation systems to meet the rapidly developing needs on high data rate. Various technologies are considered in HSDPA proposals such as adaptive modulation and coding (AMC), hybrid automatic repeat request (HARQ), fast cell selection (FCS), multiple input multiple output (MIMO) antenna processing and multicode transmission. HSDPA user equipment (UE) is suffering from multiple access interference (MAI) induced by its own multiple spreading codes and speech user interference (SUI) induced by a co-existing interfering speech user signal also known, for example, as Rel99 according to 3GPP TR25.101, "UE Radio Transmission and Reception (FDD)".

A comprehensive multiuser detection methods to suppress interference can be found in S. Verdú, *Multiuser Detection:* Cambridge University Press, 1998. Most of them are proposed for uplink communications with the knowledge of all the spreading codes. The HSDPA UE only knows its own spreading codes in multicode transmission, allocated power and modulation alphabet and has no knowledge of the interfering speech user signal. That is why blind speech user interference cancellation for suppressing the SUI is a major challenge.

Blind multiuser detectors require no training data sequence, only the knowledge of the desired user spreading code. A blind adaptive MMSE (minimum mean-square error) multiuser detector is introduced by M. Honig, U. Madhow, and S. Verdú "Blind adaptive multiuser detection," *IEEE Trans. Inform. Theory,* vol. 41, pp. 944-960, July 1995. A subspace approach for blind multiuser detection is presented by X. Wang and V. Poor, "Blind multiuser detection: a subspace approach," *IEEE Trans. Inform. Theory*, vol. 44, pp. 677-690, March 1998, where both the decorrelating and the MMSE detector are obtained blindly. A blind solution based on higher order statistics and nonlinear cancellation is presented by D. Samardzija, N. Mandayam, and I. Seskar, "Nonlinear adaptive blind interference cancellation for DS-CDMA systems," in *The IEEE Vehicular Technology Conf.e (VTC)*, Boston, Mass., September 2000. Alternative adaptive and blind solutions have been analyzed by S. Ulukus and R. Yates, "A blind adaptive decorrelating detector for CDMA systems," *IEEE J. Select. Areas Commun.,* vol. 16, pp. 1530-1541, October 1998, and overviewed by U. Madhow, "Blind adaptive interference suppression for direct-sequence CDMA," in *Proc. IEEE,* Special Issue on Blind Identification and Equalization, October 1998, pp. 2049-2069.

These proposed adaptive receivers are based mostly on the linear MMSE criterion. Through the central limit theorem, the SUI tends to be a Gaussian random process when the number of interfering speech users with random time delay is high enough. In this case, the MMSE principle leads to minimization of error probability. However, most of the base station (BS) transmission power and spreading codes will be assigned to a high speed user in HSDPA with a reasonably lower number of speech users in practical synchronous DL transmission. In this situation, the SUI does not tend to be Gaussian distributed, which triggers the research and development on SUI detection and nonlinear interference cancellation.

2. System Model

The discrete-time received signal at HSDPA UE can be presented as $$r = H(S_h A_h b_h + S_s A_s b_s + S_p A_p b_p) + n \in C^{P \times 1} \quad (1)$$

wherein $H \in C^{P \times P}$ is a matrix containing multipath channel impulse response in a time domain, $P = R_{chip} \times T_{TTI}$ is a number of chips per transmission time interval (TTI) with $R_{chip} = 3.84$ Mcps (typical value) is the chip rate and $T_{TTI} = 2$ ms (typical value) is the time period of TTI, C is a complex space, $n \in C^{P \times 1}$ is a noise vector.

$$S_h = diag\left(\hat{S}_h, \ldots, \hat{S}_h\right)^{P/SF_1} \in R^{P \times L_h}$$

is a block-based diagonal matrix over one TTI, wherein $SF_1 = 16$ (typical value) is a spreading factor (SF) of a desired HSDPA signal with known spreading codes, $$L_h = \frac{P}{SF_1} N_h$$

is a number of HSDPA parallel data symbols transmitted per TTI, $N_h$ is a number of assigned multicodes, $\Re$ is a real value space, $\hat{S}_h = [s_1^h; s_2^h; \ldots; s_{N_h}^h] \in \Re^{SF_1 \times N_h}$ is a spreading code matrix over one HSDPA symbol period, $s_i^h \in \Re^{SF_1 \times 1}$ is an $i^{th}$ assigned $SF_1$-bit Walsh code vector, $A_h \in \Re^{L_h \times L_h}$ is a diagonal matrix with HSDPA symbol energy, $b_h \in C^{L_h \times 1}$ is a transmitted HSDPA symbol vector per TTI.

$$S_s = diag\left(\hat{S}_s, \ldots, \hat{S}_s\right)^{P/SF_2} \in R^{P \times L_s}$$

is a block-based diagonal matrix over one TTI, wherein $SF_2 = 128$ (typical value) is a spreading factor of an interfering speech user signal with unknown spreading codes, $$L_s = \frac{P}{SF_2} N_s$$

is a number of interfering speech user parallel data symbols transmitted per TTI, $N_s$ is a number of co-existing interfering speech users, $\hat{S}_s = [s_1^s; s_2^s; \ldots; s_{N_s}^s] \in \Re^{SF_2 \times N_s}$ is a spreading code matrix over one interfering speech user symbol period, $s_i^s \in \Re^{K_2 \times 1}$ is the $i^{th}$ assigned $SF_2$-bit Walsh code vector, $A_s \in$ $\Re^{L_s \times L_s}$ is a diagonal matrix with interfering speech user symbol energy, $b_s \in C^{L_s \times 1}$ is a transmitted interfering speech user symbol vector per TTI.

$$s_p = \begin{bmatrix} \hat{s}_p, \ldots, \hat{s}_p \end{bmatrix}^{P/SF_3} \in R^{P \times 1}$$

is a spreading vector for a common pilot channel (CPICH), wherein $SF_3=256$ (typical value) is a spreading factor of a pilot signal, $$L_p = \frac{P}{SF_3}$$

is a number of parallel pilots per TTI, $\hat{s}_p \in \Re^{SF_3 \times 1}$ is one assigned $K_3$-bit Walsh code vector, $A_p \in \Re^{L_p \times L_p}$ is a diagonal matrix with pilot energy, $b_p \in C^{L_p \times 1}$ is a pilot vector per TTI.

3. Conventional RAKE Receiver

The conventional RAKE receiver (RAKER) neglects the MAI induced by its own spreading codes and SUI induced by co-existing interfering speech users and CPICH interference so Equation 1 can be rewritten for the RAKER as follows $$r_{raker} = HS_h A_h b_h + (I_{MAI} + I_{SUI} + I_{CPICH}) + n, \quad (2)$$

so that a hard-decision (HD) data estimated by RAKER can be written as $$\tilde{b}_{dec}(z) = dec(A_h^H S_h^H H^H r_{raker}), \quad (3)$$

Wherein dec( ) is a decision device based on modulation alphabets, z is a SD output of RAKER, and $( )^H$ denotes a complex conjugate transpose operation.

Common Pilot cancellation in UE has recently gained attention for CDMA cellular networks and it has been shown that the network capacity can be significantly improved as described in 3GPP TR 25.991: Feasibility study on the mitigation of the effect of the common pilot channel (CPICH) interference at the user equipment, 2002, and in 3GPP R4-01-1232, Motorola, "CPICH Cancellation Complexity."

Since the UE has the knowledge of the CPICH on power, spreading codes and pilot symbols for channel estimation, the interference induced by the CPICH can be subtracted directly as follows $$\tilde{r} = r - I_{CPICH} = r - HS_p A_p b_p. \quad (4)$$

Then the same RAKER principle of Equation 3 can be applied for the received signal with CPICH interference cancellation described by Equation 4.

4. Conventional PIC Receiver

In contrast to the RAKE receiver, a conventional parallel interference cancellation (PIC) receiver described by M. K. Varanasi and B. Aazhang, "Multistage detection for asynchronous code-division multiple-access communications," *IEEE Transactions on Communications*, COM-38(4), April 1990, suppresses the MAI induced by its own spreading codes with the knowledge of allocated power, assigned spreading codes and modulation alphabet. However, it still neglects SUI induced by the co-existing interfering speech users and CPICH interference. Using the conventional RAKER output as the initial estimates as $\tilde{b}_{pic}(0) = \tilde{b}_{raker}$, the hard-decision data estimates of PIC at $m^{th}$ stage can be described as $$\tilde{b}_{pic}(m) = dec(z - F\tilde{b}_{pic}(m-1)) \quad (5)$$

wherein $F = G - diag(G)$ is the off-diagonal matrix, diag( ) denotes diagonal elements of the matrix, $G = A_h^H S_h^H H^H H S_h A_h$ is the cross-correlation matrix.

SUMMARY OF THE INVENTION

The object of the present invention is to provide a blind speech user interference cancellation (SUIC) for a high speed downlink packet access (HSDPA).

According to a first aspect of the present invention, a method of a blind speech user interference cancellation (SUIC) for a high speed downlink packet access (HSDPA) comprising the steps of: receiving an input signal in a discrete-time domain by a receiving and storing means of a blind SUIC receiver; and separating the input signal to a desired HSDPA signal with known spreading codes and to an interfering speech user signal with unknown spreading codes using a Walsh correlator of the blind SUIC receiver for further processing.

In further accord with the first aspect of the invention, the receiving and storing means having a memory buffer for storing the input signal.

Still further according to the first aspect of the invention, the method further comprises the steps of: generating a speech user interference signal by a soft-decision on the interfering speech user signal using an SUI estimation means of the blind SUIC receiver; generating an adjusted signal by subtracting the SUI signal from the input signal using a first adder; and providing the adjusted signal to the Walsh correlator.

Further still according to the first aspect of the invention, the method further comprises the steps of separating the adjusted signal to a further desired HSDPA signal with the known spreading codes and a further interfering speech user signal with the unknown spreading codes using a Walsh correlator; and generating a soft-decision HSDPA signal from the further desired HSDPA signal using a one-stage soft-decision parallel interference cancellation (SD-PIC) receiver. Also further, the soft-decision HSDPA signal (37) is a blind SUIC receiver output signal if a final multistage is reached based on predetermined criteria.

According further to the first aspect of the invention, the method further comprises the steps of: generating a hard-decision HSDPA signal based on the soft-decision HSDPA signal using a hard-decision means; generating a multiple access interference (MAI) signal based on the hard-decision HSDPA signal (38) using an MAI estimation means of the blind SUIC receiver; generating a further adjusted signal by subtracting the MAI signal from the input signal using a second adder; and providing the further adjusted signal to further Walsh correlator.

Yet further still according to the first aspect of the invention, the method further comprises the step of generating a soft-decision HSDPA signal from the desired HSDPA signal using a one-stage soft-decision parallel interference cancellation (SD-PIC) receiver. Further, the soft-decision HSDPA signal is a blind SUIC receiver output signal, if a final multistage is reached based on predetermined criteria.

According further still to the first aspect of the invention, the method further comprises the steps of: generating the hard-decision HSDPA signal based on the soft-decision HSDPA signal using a hard-decision means; generating a multiple access interference (MAI) signal based on the hard-decision HSDPA signal using an MAI estimation means of the blind SUIC receiver; generating an adjusted signal by subtracting the MAI signal from the input signal using a first adder; and providing the adjusted signal to the Walsh correlator.

In further accord with the first aspect of the invention, the method further comprises the steps of: separating the adjusted signal to a further desired HSDPA signal with the known spreading codes and a further interfering speech user signal with the unknown spreading codes using a Walsh correlator; generating a speech user interference (SUI) signal by a soft-decision on the further interfering speech user signal using an SUI estimation means of the blind SUIC receiver; generating a further adjusted signal by subtracting the SUI signal from the input signal using a second adder; and providing the further adjusted signal to a further Walsh correlator.

According to a second aspect of the invention, a blind speech user interference cancellation (SUIC) receiver for a high speed downlink packet access (HSDPA) comprises: a Walsh correlator, responsive to an input signal in a discrete-time domain, for providing two signals for a further processing by separating the input signal to a desired HSDPA signal with known spreading codes and to an interfering speech user (ISU) signal with unknown spreading codes; and receiving and storing means, responsive to the input signal, for storing the input signal and for providing the input signal to the Walsh correlator.

According further to the second aspect of the invention, the blind speech user interference cancellation (SUIC) receiver further comprises: an SUI estimation means, responsive to the interfering speech user signal, for providing a speech user interference (SUI) signal by a soft-decision on the interfering speech user signal; and a first adder, responsive to the SUI signal and to the input signal, for providing an adjusted signal to the Walsh correlator by subtracting the SUI signal from the input signal, wherein the Walsh correlator provides a further desired HSDPA signal with the known spreading codes and a further interfering speech user (ISU) signal with the unknown spreading codes.

Further according to the second aspect of the invention, the blind speech user interference cancellation (SUIC) receiver further comprises a one-stage soft-decision parallel interference cancellation (SD-PIC) receiver, responsive to the further desired HSDPA signal, for providing a soft-decision HSDPA signal. Further, the soft-decision HSDPA signal becomes a blind SUIC receiver output signal based on predetermined criteria.

Further still according to the second aspect of the invention, the blind speech user interference cancellation (SUIC) receiver further comprises: a hard-decision means, responsive to the soft-decision HSDPA signal, for providing a hard-decision HSDPA signal; an MAI estimation means, responsive to the hard-decision HSDPA signal, for providing a multiple access interference (MAI) signal; and a second adder, responsive to the MAI signal and to the input signal, for providing a further adjusted signal by subtracting the MAI signal from the input signal, wherein the further adjusted signal is provided to a further Walsh correlator.

In further accord with the second aspect of the invention, the blind speech user interference cancellation (SUIC) receiver further comprises a one-stage soft-decision parallel interference cancellation (HD-PIC) receiver, responsive to the desired HSDPA signal, for providing a soft-decision HSDPA signal. Further, the soft-decision HSDPA signal becomes a blind SUIC receiver output signal based on pre-determined criteria.

Further still according to the second aspect of the invention, the blind speech user interference cancellation (SUIC) receiver further comprises: a hard-decision means, responsive to the soft-decision HSDPA signal, for providing a hard-decision HSDPA signal; an MAI estimation means, responsive to the hard-decision HSDPA signal, for providing a multiple access interference (MAI) signal; and a first adder, responsive to the MAI signal and to the input signal, for providing a further adjusted signal to the Walsh correlator by subtracting the MAI signal from the input signal, wherein the Walsh correlator provides a further desired HSDPA signal with known spreading codes and a further interfering speech user signal with unknown spreading codes.

In further accordance with the second aspect of the invention, the blind speech user interference cancellation (SUIC) receiver further comprises: an SUI estimation means, responsive to the further interfering speech user signal, for providing a speech user interference (SUI) signal by a soft-decision on the further interfering speech user signal; and a second adder, responsive to the SUI signal and to the input signal, for providing a further adjusted signal to a further Walsh correlator by subtracting the SUI signal from the input signal.

BRIEF DESCRIPTION OF THE DRAWINGS

For a better understanding of the nature and objects of the present invention, reference is made to the following detailed description taken in conjunction with the following drawings, in which.

BEST MODE FOR CARRYING OUT THE INVENTION

An advanced nonlinear blind speech user interference cancellation (SUIC) receiver, which jointly detects a desired HSDPA signal by a hard-decision (HD) and an interfering speech user signal by a soft-decision (SD) using multistage processing, is described in this invention. In the disclosed blind SUIC receiver, a full Walsh transform correlator is used instead of a conventional RAKE receiver (RAKER), where the outputs are categorized into two parts: the desired HSDPA signal with known spreading codes and the interfering speech user (ISU) signal with unknown spreading codes, respectively. HSDPA user equipment (UE) has no knowledge of the number of co-existing interfering speech users, their powers due to a power control, their spreading codes and related modulation constellations. That is why only the soft-decision is made over the interfering speech user signal output of the Walsh correlator. Based on that soft-decision, a speech user interference (SUI) is regenerated and subtracted from the received signal, correspondingly. In contrast, the hard-decisions are made over the desired HSDPA signal output of the Walsh correlator (the same as the outputs of the conventional RAKER) over the SUI-free signal with the knowledge of allocated power and modulation alphabet. The hard-decisions of RAKER are used as initial estimates and a conventional parallel interference cancellation (PIC) is applied to suppress a multiple access interference (MAI). The joint detection on both the HD of the desired HSDPA signal and the SD of the interfering speech user signal can be repeated using multiple stages until a predefined number of stages is reached which relates to predetermined criteria, for example, a targeted convergence rate or a targeted bit error rate (BER). The order of the joint detection in the blind SUIC receiver can be varied such that the HD of the desired HSDPA signal is estimated first and the induced MAI is regenerated and subtracted and then the SD of the interfering speech user signal is estimated over the MAI-free received signal.

Figure 1:
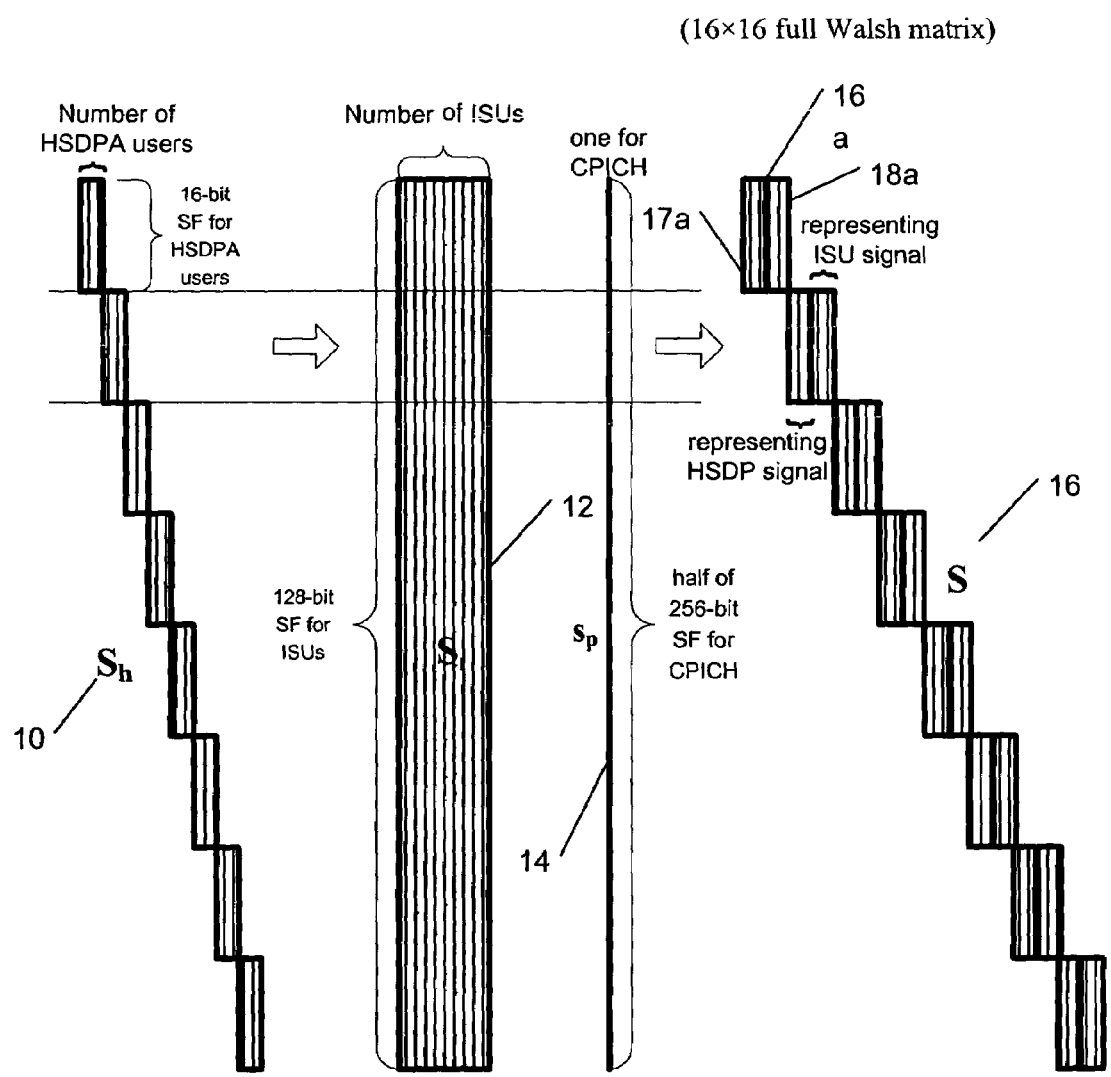
FIG. 1 is a block diagram representing a full Walsh transform matrix setup, according to the present invention.

FIG. 1 is a block diagram representing an example of a fill Walsh transform matrix setup, according to the present invention. In one scenario shown in FIG. 1, a full 16×16 Walsh transform correlator (referred to as a Walsh correlator) is used to detect both the desired HSDPA signal with known spreading codes represented by an HSDPA matrix $S_h$ 10 and the interfering speech user (ISU) signal with unknown spreading codes represented by an ISU matrix $S_r$ 12, respectively. Referring to Equation 1, for the example of FIG. 1, the following assumptions are made: $T_{chip}$=3.84 Mcps, $T_m$=2 ms, P=7680, $SF_1$=16, $SF_2$=128, and $SF_3$=256.

Then a discrete-time received signal r represented by a matrix S16 at the HSDPA UE can be simplified from Equation 1 as follows $$r=HSd+n, \quad (6)$$

wherein $$S = diag\left(\overbrace{\hat{S}, \ldots, \hat{S}}^{480=7680/16}\right) \in R^{P \times P}$$

with $\hat{S}=\lfloor \hat{S}_h\ \hat{S}_r \rfloor$ is a full 16×16 Walsh matrix, $$d = \overbrace{d_1, \ldots, d_j, \ldots, d_{480}}^{480=7680/16} \in C^{P \times 1}$$

is a vector including HSDPA and ISU symbols, $d_j=[d_h^j\ d_r^j]$ is a vector over $j^{th}$ 16-chip period, $d_h^j=A_h^j b_h^j$ is a vector of HSDPA symbols and allocated power, and $d_r^j$ is a vector of combined ISU soft-decision symbols. Each diagonal member $\hat{S}$16a is a product of $\hat{S}_h$ 17a and $\hat{S}_r \in \Re^{16 \times (16-N_h)}$ 18a, wherein $\hat{S}_h$ is a 16-bit Walsh code representing HSDPA users and $\hat{S}_r$ is a remainder of the 16-bit Walsh code representing ISUs. Equation 6 is also based on the fact that over the 16-chip period, a CPICH matrix $s_p$ 14 is identical to one column of the matrix $S_r$ 12.

The ISU symbols are always periodically orthogonal to the HSDPA symbols over a 16-chip interval. However, the orthogonality of the 128-bit Walsh code of the co-existing ISUs is destroyed over a 16-chip time period, where some of them are identical and these identical sections could be combined. Then the partial matrix of ISU over 16 chips could be condensed into a 16×16 fill Walsh matrix by merging with the spreading matrix of the HSDPA.

The symbols of these interfering speech users are overlapped over the 16 chips as well. Even though the interfering speech user signals are normally fixed to a QPSK modulation, the modulation constellation points are still deviated due to a symbol overlapping. Additionally, the HSDPA UE has no knowledge of the number of co-existing interfering speech users, their powers due to a power control, and spreading codes. It makes the HD impossible for ISU symbol estimates. However, it doesn't matter because, according to this invention, SUI is regenerated by SD symbol estimates.

Figure 2A:
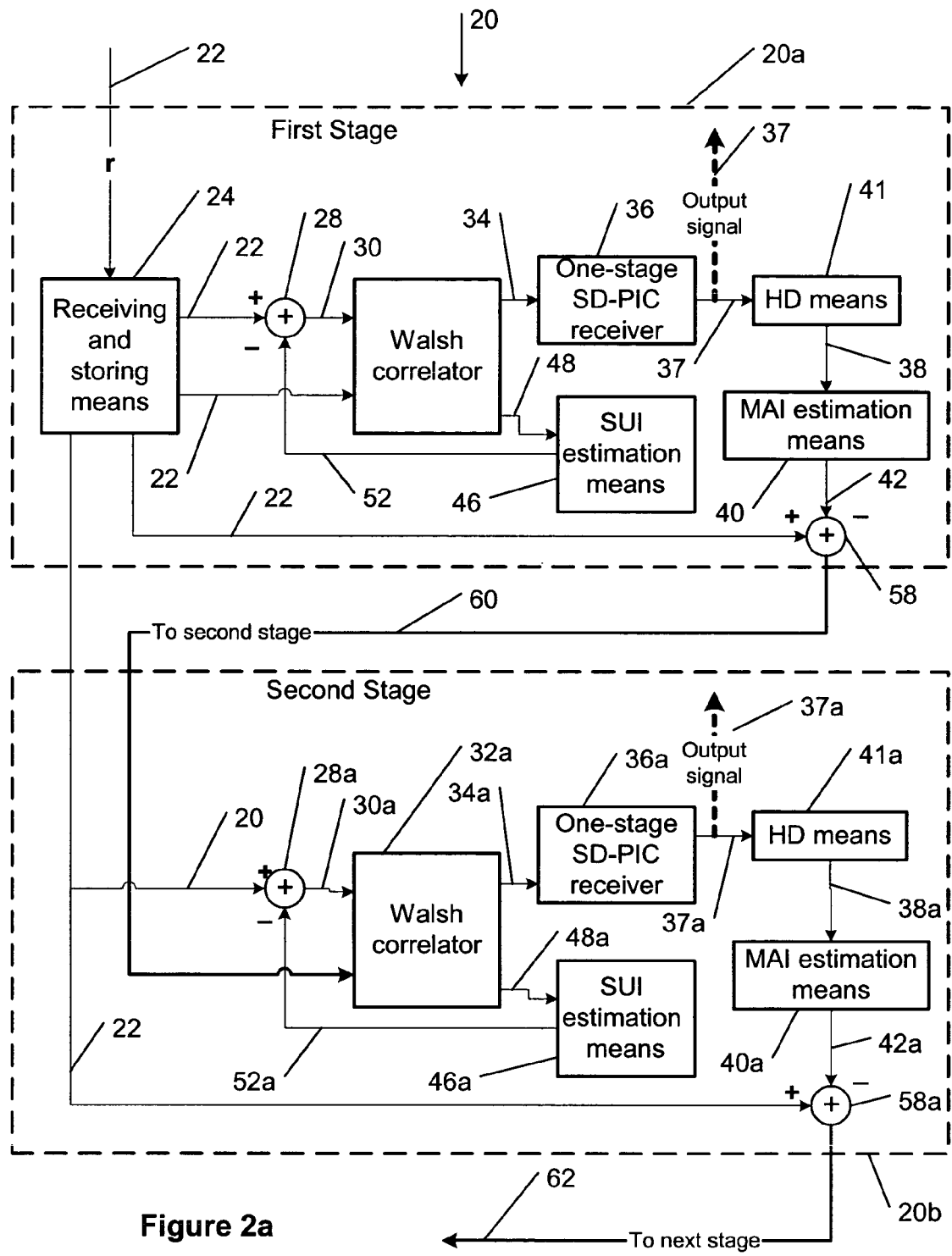
FIG. 2a is a block diagram representing a blind pre-SUIC receiver, according to the present invention.

FIG. 2a is a block diagram representing a blind pre-SUIC receiver 20, according to the present invention.

An input signal r22 is received and stored by a receiving and storing means 24. The receiving and storing means 24 provides the input signal 22 to the Walsh correlators 32, 32a, etc. The outputs of the full 16×16 Walsh correlator 32 of a first stage 20a of the blind pre-SUIC receiver 20, according to the present invention, are categorized into two parts: the desired HSDPA signal 34 with known spreading codes and the interfering speech user (ISU) signal 48 with unknown spreading codes, respectively. The soft-decision symbol on the ISU signal 48, 48a at $m^{th}$ stage using the example presented in FIG. 1, can be estimated by an SUI estimation means 46 as $$\hat{d}_r(m)=S_r^H H^H r, \quad (7)$$

wherein $$S_r = diag\left(\overbrace{\hat{S}_r, \ldots, \hat{S}_r}^{480=7680/16}\right) \in R^{P \times L_r}$$

and $L_r$=480×(16−$N_h$). Based on the soft-decision on the ISU signal 48, the SUI is regenerated by the SUI estimation means 46, forming an SUI signal 52. The SUI signal 52 is subtracted from the received signal 22 using a first adder 28 generating an adjusted signal 30 as follows $$\tilde{r}=r-HS_r\hat{d}_r(m). \quad (8)$$

The adjusted signal 30 is further provided to the Walsh correlator 32, which separates the adjusted signal 30 to a further desired HSDPA signal with the known spreading codes and a further interfering speech user (ISU) signal with the unknown spreading codes. A soft-decision HSDPA signal 37 generated by a one-stage soft-decision conventional parallel interference cancellation (SD-PIC) receiver 36 on the SUI-free further desired HSDPA signal can be written (similar to the HD-PIC data estimate of Equation 5) as $$\tilde{b}_{pic}(m)=\tilde{z}-F\tilde{b}_{init}, \quad (9)$$

where $\tilde{z}=A_h^H S_h^H H^H \tilde{r}$ and $\tilde{b}_{init}=dec(\tilde{z})$. If the final stage of processing is reached, the soft-decision HSDPA signal 37 is an output of the blind SUIC receiver 20 for further processing (i.e. demodulation and channel decoding). Otherwise, in contrast to the soft-decision (SD) on the ISU signal 48, a hard-decision HSDPA signal 8 is generated by a hard-decision means 41 on the soft-decision HSDPA signal 37 as $$\tilde{b}_{pic}(m)=dec(\tilde{b}_{pic}(m)). \quad (9a)$$

The further processing proceeds as follows. The hard-decision HSDPA signal 38 is regenerated, forming an MAI signal 42 using an MAI estimation means 40. Said MAI signal 42 is subtracted from the received signal 22 forming a further adjusted signal 60 by a second adder 58 as $$\hat{r}=r-HS_r A_r \tilde{b}_{pic}(m). \quad (10)$$

The further adjusted signal 60 is provided to a second stage 20b of the blind pre-SUIC receiver 20. The second stage 20b is identical to the first stage 20a. Then, the second stage 20b provides the more reliable SD on the ISU signal 48*a*, obtained from the received signal 60 with HSDPA MAI cancellation on the first stage 20*a* as $$\hat{d}_r(m) = S_r^H H^H \hat{r}. \quad (11)$$

The above mentioned processing (Equations 7 through 11) for joint detection by the HD on the desired HSDPA and by the SD on the ISU signals can be repeated using multiple stages until the predefined number of stages is reached, which relates to a targeted convergence rate or to a targeted bit error rate (BER). Equations 7 through 11 represent only one estimation method among many others, which can be used based on the present invention.

According to the present invention, it follows from FIG. 1 that the SUIC UE combines and condenses the fractional parts of both 128-bit Walsh code for the ISUs and 256-bit Walsh code for the CPICH. Therefore, during the iterative SUI estimation and cancellation in the blind SUIC receiver 20, the interference induced by the CPICH is also suppressed so that there is no need for an additional CPICH cancellation.

Figure 2B:
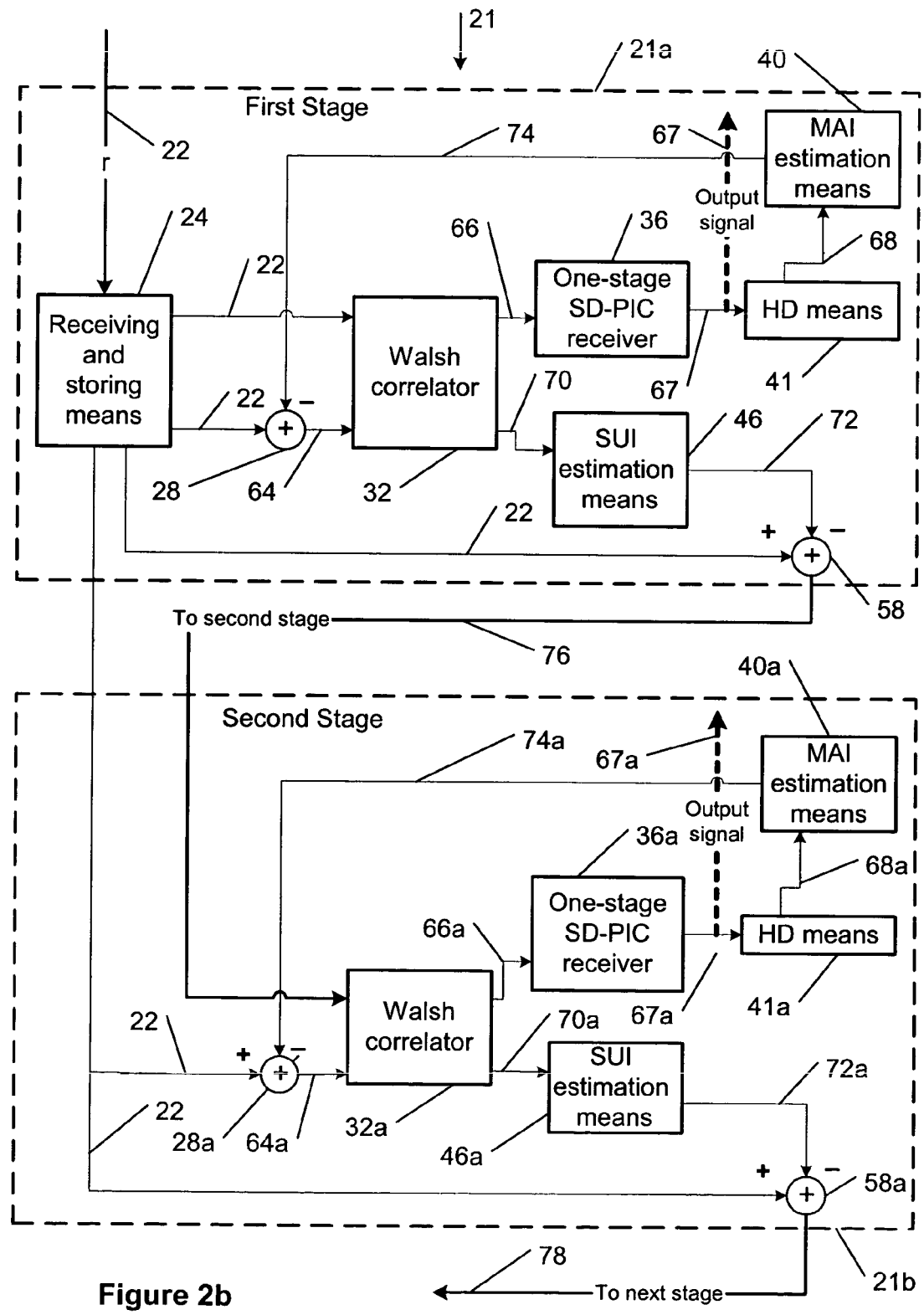
FIG. 2b is a block diagram representing a blind post-SUIC receiver, according to the present invention.

FIG. 2*b* is a block diagram representing a blind post-SUIC receiver 21, according to the present invention. The performance of a post blind post-SUIC receiver 21 is similar to the performance of the blind pre-SUIC receiver 20. Equations 7-11 are applicable to the appropriate blocks of the blind post-SUIC receiver 21. The difference is that in the blind post-SUIC receiver 21, the order of the joint detection in the blind-SUIC receiver is varied such that the HD of the desired HSDPA signal is estimated first and the induced MAI is regenerated and subtracted and then the SD of the interfering speech user signal is estimated over the MAI-free received signal.

In particular, the outputs of the full 16×16 Walsh correlator 32 of a first stage 21*a* of the blind pre-SUIC receiver 21, according to the present invention, are categorized into two parts: the desired HSDPA signal 66 with the known spreading codes and the interfering speech user (ISU) signal 70 with the unknown spreading codes, respectively. A soft-decision HSDPA signal 67 is generated by the one-stage SD-PIC receiver 36 using the desired HSDPA signal 66. If the final stage of processing is reached, the soft-decision HSDPA signal 67 is an output of the proposed blind SUIC receiver 21 for further processing (i.e. demodulation and channel decoding). Otherwise, the further processing proceeds as follows. A hard-decision HSDPA signal 68 is generated by a hard-decision means 41 on the soft-decision HSDPA signal 67. The hard-decision HSDPA signal 38 is regenerated, forming an MAI signal 74 using the MAI estimation means 40. Said MAI signal 74 is subtracted from the received signal 22 forming an adjusted signal 64 by the first adder 28. The adjusted signal 64 is further provided to the Walsh correlator 32, which separates the adjusted signal 64 to a further desired HSDPA signal with known spreading codes and a further interfering speech user (ISU) signal with unknown spreading codes. Based on the soft-decision on the further ISU signal 70, the SUI is regenerated by the SUI estimation means 46, forming an SUI signal 72. The SUI signal 72 is subtracted from the received signal 22 using a second adder 58 generating a further adjusted signal 76. The further adjusted signal 76 is provided to a second stage 21*b* of the blind post-SUIC receiver 21, which is identical to the first stage 21*a*.

Figure 3A:
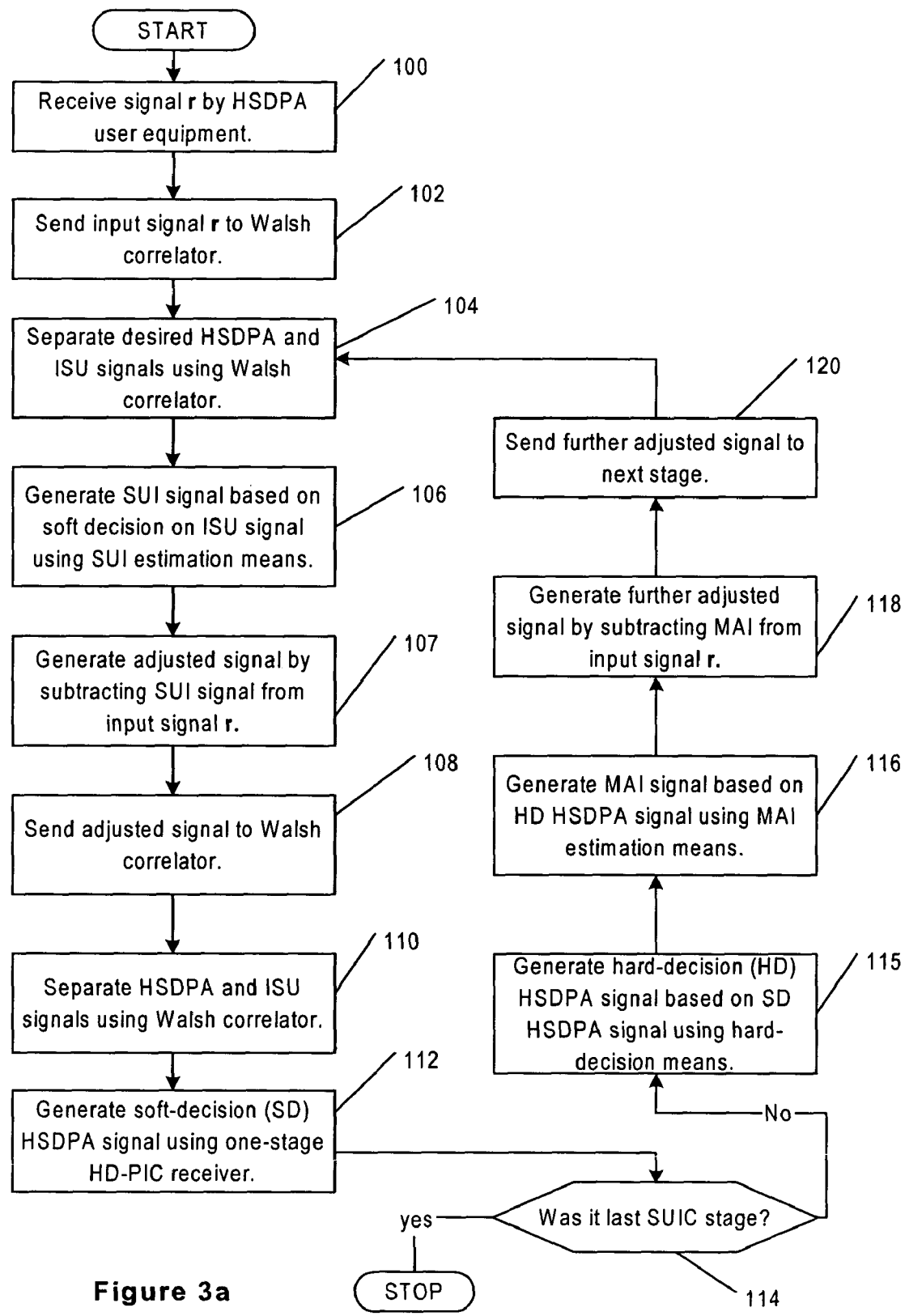
FIG. 3a shows a flow chart illustrating operation of a blind pre-SUIC receiver, according to the present invention.

FIG. 3*a* shows a flow chart illustrating operation of a blind pre-SUIC receiver of FIG. 2*a*, according to the present invention. In a method according to the present invention, in a first step 100, the input signal r22 is received and stored by the receiving and storing means 24. In a next step 102, the receiving and storing means 24 provides the input signal 22 to the Walsh correlator 32. In a next step 104, the Walsh correlator 32 of a first stage 20*a* of the blind pre-SUIC receiver 20 separates the input signal 22 to the desired HSDPA signal 34 with known spreading codes and to the interfering speech user (ISU) signal 48 with unknown spreading codes, respectively. In a next step 106, the SUI estimation means 46 generates the SUI signal 52 using the soft-decision on the ISU signal 48. In a next step 107, the first adder 28 generates the adjusted signal 30 by subtracting the SUI signal 52 from the received signal 22. In a next step 108, the adjusted signal 30 is provided to the Walsh correlator 32. In a next step 110, the Walsh correlator 32 separates the adjusted signal 30 to the further desired HSDPA signal with the known spreading codes and to the further ISU signal with the unknown spreading codes. In a next step 112, the soft-decision HSDPA signal 37 is generated by the one-stage SD-PIC receiver 36 using the further desired HSDPA signal. In a next step 114, it is ascertained whether further processing is required based on the predetermined criteria, for example, the targeted convergence rate or desired BER. As long as no further processing is required, the soft-decision HSDPA signal 37 becomes the output of the blind SUIC receiver 20. However, if it is ascertained that further processing is required, in a next step 115, the hard-decision HSDPA signal 38 is generated by the hard-decision means 41 using the soft-decision HSDPA signal 37. In a next step 116, the MAI signal 42 is generated using the MAI estimation means 40 based on the hard-decision HSDPA signal 38. Said MAI signal 42 is subtracted from the received signal 22 forming the further adjusted signal 60 by the second adder 58. Finally, in a step 120, the further adjusted signal 60 is sent to the Walsh correlator 32*a* of the second stage 20*b* of the blind pre-SUIC receiver 20 and the process repeats.

Figure 3B:
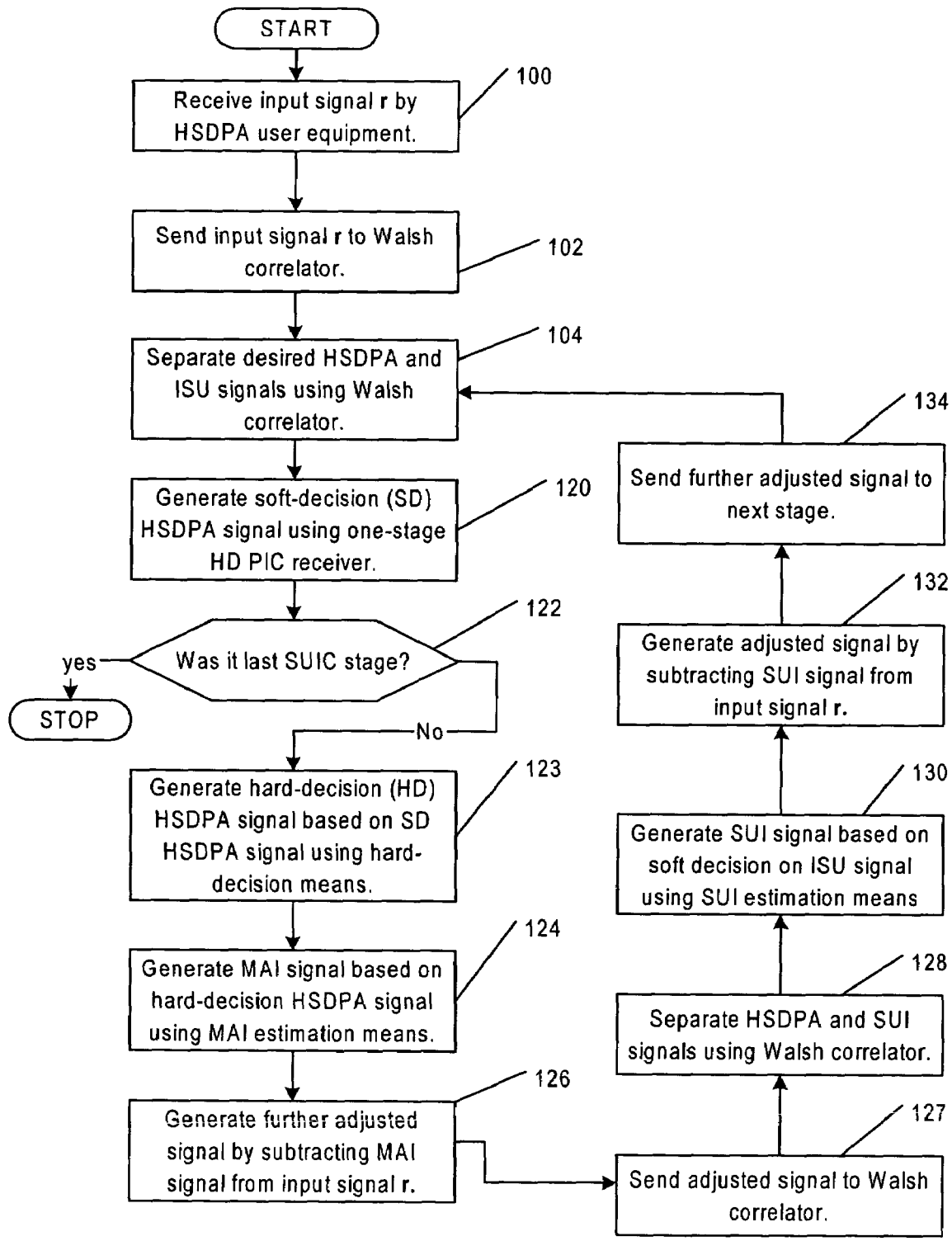
FIG. 3b shows a flow chart illustrating operation of a blind post-SUIC receiver.

FIG. 3*b* shows a flow chart illustrating operation of a blind post-SUIC receiver, according to the present invention. In a method according to the present invention, in a first step 100, the input signal r22 is received and stored by the receiving and storing means 24. In a next step 102, the receiving and storing means 24 provides the input signal 22 to the Walsh correlator 32. In a next step 104, the Walsh correlator 32 of a first stage 21 *a* of the blind pre-SUIC receiver 21 separates the input signal 22 to the desired HSDPA signal 66 with known spreading codes and to the interfering speech user (ISU) signal 70 with unknown spreading codes, respectively.

In a next step 120, the soft-decision HSDPA signal 67 is generated by the one-stage SD-PIC receiver 36 using the desired HSDPA signal 66. In a next step 122, it is ascertained whether further processing is required based on the predetermined criteria, for example, the targeted convergence rate or desired BER. As long as no further processing is required, the soft-decision HSDPA signal 67 becomes the output of the blind post-SUIC receiver 21. However, if it is ascertained that further processing is required, in a next step 123, the hard-decision HSDPA signal 68 is generated by the hard-decision means 41 using the soft-decision HSDPA signal 67. In a next step 124, the MAI signal 74 is generated using the MAI estimation means 40 based on the hard-decision HSDPA signal 68. In a next step 126, said MAI signal 74 is subtracted from the received signal 22 forming the adjusted signal 64 by the first adder 28. In a next step 127, the adjusted signal 64 is provided to the Walsh correlator 32. In a next step 128, the Walsh correlator 32 separates the adjusted signal 64 to the further desired HSDPA signal with the known spreading codes and to the further ISU signal with the unknown spreading codes. In a next step 130, the SUI estimation means 46 generates the SUI signal 72 using the soft-decision on the further ISU signal. In a next step 132, the second adder 58 generates the further adjusted signal 76 by subtracting the SUI signal 72 from the received signal 22. Finally, in a step 134, the further adjusted signal 76 is sent to the Walsh correlator 32a of the second stage 21b of the blind pre-SUIC receiver 21 and the process repeats.

What is claimed is:

1. A method comprising:

receiving an input signal in a discrete-time domain by a blind speech user interference cancellation receiver for a high speed downlink packet access;

separating the input signal to a desired high speed downlink packet access signal with known spreading codes and to an interfering speech user signal with unknown spreading codes using a Walsh correlator of the blind speech user interference cancellation receiver for further processing;

generating a soft-decision high speed downlink packet access signal from the desired high speed downlink packet access signal using a one-stage soft-decision parallel interference cancellation receiver;

generating a hard-decision high speed downlink packet access signal based on the soft-decision high speed downlink packet access signal using a hard-decision means;

generating a multiple access interference signal based on the hard-decision high speed downlink packet access signal using multiple access interference estimation means of the blind speech user interference cancellation receiver;

generating an adjusted signal by subtracting the multiple access interference signal from the input signal using a first adder;

providing the adjusted signal to the Walsh correlator; and separating the adjusted signal to a further desired high speed downlink packet access signal with the known spreading codes and a further interfering speech user signal with the unknown spreading codes using the Walsh correlator.

2. The method of claim 1, wherein after receiving said input signal the method comprising:

storing said input signal in a memory buffer.

3. The method of claim 1, wherein the soft-decision high speed downlink packet access signal is a blind speech user interference cancellation receiver output signal, if a final multistage is reached based on predetermined criteria.

4. The method of claim 1, further comprising:

generating a speech user interference signal by a soft-decision on the further interfering speech user signal using a speech interference estimation means of the blind speech user interference cancellation receiver;

generating a further adjusted signal by subtracting the speech user interference signal from the input signal using a second adder; and providing the further adjusted signal to a further Walsh correlator.

5. A method comprising:

receiving an input signal in a discrete-time domain by a blind speech user interference cancellation receiver for a high speed downlink packet access;

separating the input signal to a desired high speed downlink packet access signal with known spreading codes and to an interfering speech user signal with unknown spreading codes using a Walsh correlator of the blind speech user interference cancellation receiver for further processing;

generating a speech user interference signal by a soft-decision on the interfering speech user signal using a speech user interference estimation means of the blind speech user interference cancellation receiver;

generating an adjusted signal by subtracting the speech user interference signal from the input signal using a first adder;

providing the adjusted signal to the Walsh correlator;

separating the adjusted signal to a further desired high speed downlink packet access signal with the known spreading codes and a further interfering speech user signal with the unknown spreading codes using a Walsh correlator;

generating a soft-decision high speed downlink packet access signal from the further desired high speed downlink packet access signal using a one-stage soft-decision parallel interference cancellation receiver;

generating a hard-decision high speed downlink packet access signal based on the soft-decision high speed downlink packet access signal using a hard-decision means;

generating a multiple access interference signal based on the hard-decision high speed downlink packet access signal using multiple access interference estimation means of the blind speech user interference cancellation receiver;

generating a further adjusted signal by subtracting the multiple access interference signal from the input signal using a second adder; and providing the further adjusted signal to a further Walsh correlator.

6. The method of claim 5, wherein the soft-decision high speed downlink packet access signal is a blind speech user interference cancellation receiver output signal if a final multistage is reached based on predetermined criteria.

7. A blind speech user interference cancellation receiver comprising:

a Walsh correlator, responsive to an input signal in a discrete-time domain, configured to provide two signals for a further processing by separating the input signal to a desired high speed downlink packet access signal with known spreading codes and to an interfering speech user signal with unknown spreading codes;

speech user interference estimation means, responsive to the interfering speech user signal, configured to provide a speech user interference signal by a soft-decision on the interfering speech user signal;

a first adder, responsive to the speech user interference signal and to the input signal, configured to provide an adjusted signal to the Walsh correlator by subtracting the speech user interference signal from the input signal, wherein the Walsh correlator is configured to provide a further desired high speed downlink packet access signal with the known spreading codes and a further interfering speech user signal with the unknown spreading codes;

a one-stage soft-decision parallel interference cancellation receiver, responsive to the further desired high speed downlink packet access signal, configured to provide a soft-decision high speed downlink packet access signal;

a hard-decision means, responsive to the soft-decision high speed downlink packet access signal, configured to provide a hard-decision high speed downlink packet access signal;

multiple access interference estimation means, responsive to the hard-decision high speed downlink packet access signal, configured to provide a multiple access interference signal; and a second adder, responsive to the multiple access interference signal and to the input signal, configured to provide a further adjusted signal, by subtracting the multiple access interference signal from the input signal to a further Walsh correlator.

8. The blind speech user interference cancellation receiver of claim 7, wherein the soft-decision high speed downlink packet access signal is a blind speech user interference cancellation receiver output signal if a predetermined criterion is met.

9. The blind speech user interference cancellation receiver of claim 7, further comprising:
  receiving and storing means, responsive to the input signal, configured to store the input signal and for providing the input signal to the Walsh correlator.

10. A blind speech user interference cancellation receiver comprising:
  a Walsh correlator, responsive to an input signal in a discrete-time domain, configured to provide two signals for a further processing by separating the input signal to a desired high speed downlink packet access signal with known spreading codes and to an interfering speech user signal with unknown spreading code;
  a one-stage soft-decision parallel interference cancellation receiver, responsive to the desired high speed downlink packet access signal, for providing a soft-decision high speed downlink packet access signal, wherein the soft-decision high speed downlink packet access signal is a blind speech user interference cancellation receiver output signal if a predetermined criterion is met;
  a hard-decision means, responsive to the soft-decision high speed downlink packet access signal, configured to provide a hard-decision high speed downlink packet access signal;
  multiple access interference estimation means, responsive to the hard-decision high speed downlink packet access signal, configured to provide a multiple access interference multiple access interference signal; and
  a first adder, responsive to the multiple access interference signal and to the input signal, configured to provide an adjusted signal to the Walsh correlator by subtracting the multiple access interference signal from the input signal, wherein the Walsh correlator is configured to separate the adjusted signal to provide a further desired high speed downlink packet access signal with known spreading codes and a further interfering speech user signal with unknown spreading codes.

11. The blind speech user interference cancellation receiver of claim 10, further comprising:
  speech user interference estimation means, responsive to the further interfering speech user signal, configured to provide a speech user interference signal by a soft-decision on the further interfering speech user signal; and
  a second adder, responsive to the speech user interference signal and to the input signal, configured to provide a further adjusted signal to a further Walsh correlator by subtracting the speech user interference signal from the input signal.

* * * * *